United States Patent
Fredslund et al.

(10) Patent No.: US 10,941,964 B2
(45) Date of Patent: Mar. 9, 2021

(54) METHOD FOR OPERATING A VAPOUR COMPRESSION SYSTEM WITH A RECEIVER

(71) Applicant: DANFOSS A/S, Nordborg (DK)

(72) Inventors: Kristian Fredslund, Haderslev (DK); Frede Schmidt, Sønderborg (DK); Kenneth Bank Madsen, Ry (DK); Jan Prins, Nordborg (DK)

(73) Assignee: Danfoss A/S, Nordborg (DK)

( * ) Notice: Subject to any disclaimer, the term of this patent is extended or adjusted under 35 U.S.C. 154(b) by 181 days.

(21) Appl. No.: 15/527,496

(22) PCT Filed: Oct. 7, 2015

(86) PCT No.: PCT/EP2015/073155
§ 371 (c)(1),
(2) Date: May 17, 2017

(87) PCT Pub. No.: WO2016/078824
PCT Pub. Date: May 26, 2016

(65) Prior Publication Data
US 2017/0328604 A1    Nov. 16, 2017

(30) Foreign Application Priority Data
Nov. 19, 2014    (EP) .................................. 14193783

(51) Int. Cl.
*F25B 9/00*    (2006.01)
*F25B 41/04*   (2006.01)
*F25B 49/02*   (2006.01)

(52) U.S. Cl.
CPC ............ *F25B 9/008* (2013.01); *F25B 41/043* (2013.01); *F25B 49/02* (2013.01);
(Continued)

(58) Field of Classification Search
CPC ........ F25B 2309/061; F25B 2341/0662; F25B 2400/075; F25B 2400/13; F25B 2400/23;
(Continued)

(56) References Cited

U.S. PATENT DOCUMENTS

| 4,227,862 A * | 10/1980 | Andrew ................. F04C 28/06 417/12 |
| 7,389,648 B2 * | 6/2008 | Concha ................. F25B 9/008 62/210 |

(Continued)

FOREIGN PATENT DOCUMENTS

| CA | 2855733 A1 * | 5/2013 | ............... F25B 5/02 |
| CN | 1926391 A | 3/2007 | |

(Continued)

OTHER PUBLICATIONS

International Search Report for PCT Serial No. PCT/EP2015/073155 dated Jan. 11, 2016.

(Continued)

*Primary Examiner* — Len Tran
*Assistant Examiner* — Jenna M Hopkins
(74) *Attorney, Agent, or Firm* — McCormick, Paulding & Huber PLLC (57) ABSTRACT

A method for controlling a vapour compression system, the vapour compression system including a compressor unit with one or more compressors. At least one of the compressors is connectable to a gaseous outlet of a receiver, and at least one of the compressors is connectable to an outlet of an evaporator. A parameter of the vapour compression system is measured, an enthalpy of refrigerant leaving the heat rejecting heat exchanger being derivable from the measured parameter. A setpoint value for a pressure inside the receiver is calculated, based on the measured parameter, and the compressor unit is operated in accordance with the calcu- (Continued)

lated setpoint value, and in order to obtain a pressure inside the receiver which is equal to the calculated setpoint value. The vapour compression system is operated in an energy efficient manner over a wide range of ambient temperatures.

25 Claims, 2 Drawing Sheets (52) U.S. Cl.
CPC . *F25B 2309/061* (2013.01); *F25B 2341/0662* (2013.01); *F25B 2400/075* (2013.01); *F25B 2400/13* (2013.01); *F25B 2400/23* (2013.01); *F25B 2500/29* (2013.01); *F25B 2500/31* (2013.01); *F25B 2600/0253* (2013.01); *F25B 2600/2509* (2013.01); *F25B 2700/195* (2013.01); *F25B 2700/2106* (2013.01); *F25B 2700/21163* (2013.01); *Y02B 30/70* (2013.01)

(58) Field of Classification Search
CPC .............. F25B 2500/29; F25B 2500/31; F25B 2600/0253; F25B 2600/2509; F25B 2700/195; F25B 2700/2106; F25B 2700/21163; F25B 2600/024; F25B 2600/027; F25B 2700/019; F25B 2400/0409; F25B 1/10; F25B 49/02; F25B 9/008; F25B 2700/024; Y02B 30/741

See application file for complete search history.

(56) References Cited

U.S. PATENT DOCUMENTS

| | | | | |
|---|---|---|---|---|
| 7,891,201 | B1* | 2/2011 | Bush | F25B 1/10 62/115 |
| 10,208,985 | B2* | 2/2019 | Najafifard | F25B 9/008 |
| 10,496,108 | B2* | 12/2019 | Zha | F25B 5/02 |
| 2001/0037653 | A1* | 11/2001 | Yamanaka | F04C 23/003 62/210 |
| 2003/0182961 | A1* | 10/2003 | Nishida | B60H 1/00921 62/324.1 |
| 2004/0237550 | A1* | 12/2004 | Yamasaki | F25B 9/008 62/228.1 |
| 2004/0237553 | A1* | 12/2004 | Yamasaki | F25B 9/008 62/229 |
| 2004/0244407 | A1* | 12/2004 | Yamasaki | F25B 9/008 62/498 |
| 2005/0126194 | A1* | 6/2005 | Ebara | F04C 18/3564 62/228.3 |
| 2005/0193753 | A1* | 9/2005 | Concha | F25B 9/008 62/223 |
| 2006/0277932 | A1* | 12/2006 | Otake | F25B 1/10 62/196.1 |
| 2007/0271936 | A1* | 11/2007 | Wakamoto | F25B 7/00 62/160 |
| 2010/0115975 | A1* | 5/2010 | Mitra | B60H 1/3228 62/196.1 |
| 2010/0132399 | A1* | 6/2010 | Mitra | B60H 1/3228 62/498 |
| 2010/0175400 | A1* | 7/2010 | Kasahara | F25B 1/10 62/225 |
| 2011/0036110 | A1* | 2/2011 | Fujimoto | F24D 3/18 62/149 |
| 2011/0138835 | A1* | 6/2011 | Takayama | F24F 1/42 62/305 |
| 2011/0154839 | A1* | 6/2011 | Mihara | F25B 9/008 62/151 |
| 2011/0154840 | A1* | 6/2011 | Mihara | F25B 45/00 62/196.1 |
| 2011/0162397 | A1* | 7/2011 | Huff | F25B 1/10 62/115 |
| 2011/0314846 | A1* | 12/2011 | Heinbokel | F25B 1/005 62/115 |
| 2012/0117988 | A1* | 5/2012 | Mitra | F25B 1/10 62/115 |
| 2012/0227427 | A1* | 9/2012 | Liu | F25B 49/005 62/115 |
| 2012/0318008 | A1* | 12/2012 | Liu | B60H 1/3228 62/115 |
| 2013/0000340 | A1* | 1/2013 | Takayama | F25B 9/008 62/222 |
| 2013/0298593 | A1* | 11/2013 | Christensen | F25B 1/10 62/467 |
| 2013/0319036 | A1* | 12/2013 | Taras | F25B 9/008 62/434 |
| 2014/0151015 | A1* | 6/2014 | Sun | F25B 1/10 165/253 |
| 2014/0157811 | A1* | 6/2014 | Shimazu | F25B 1/10 62/238.6 |
| 2014/0208785 | A1* | 7/2014 | Wallace | F25B 9/008 62/115 |
| 2014/0245767 | A1* | 9/2014 | Miyakoshi | B60H 1/00785 62/159 |
| 2014/0326018 | A1 | 11/2014 | Ignatiev | |
| 2014/0352343 | A1* | 12/2014 | Hinde | F25B 1/10 62/277 |
| 2015/0219379 | A1* | 8/2015 | Sun | B60H 1/3228 62/115 |
| 2015/0300713 | A1* | 10/2015 | Sun | F25B 49/02 62/115 |
| 2016/0047578 | A1* | 2/2016 | Warren | F25B 13/00 62/115 |
| 2016/0102901 | A1* | 4/2016 | Christensen | F25B 49/022 62/117 |
| 2016/0231040 | A1* | 8/2016 | Hellmann | F25B 49/027 |
| 2016/0298883 | A1* | 10/2016 | Louvar | H05K 7/20827 |
| 2017/0159977 | A1* | 6/2017 | Hellmann | F25B 1/10 |
| 2017/0321941 | A1* | 11/2017 | Fredslund | F25B 41/00 |
| 2018/0142927 | A1* | 5/2018 | Hellmann | F25B 1/10 |
| 2018/0283750 | A1* | 10/2018 | Prins | F25B 41/00 |
| 2018/0320944 | A1* | 11/2018 | Prins | F25B 5/02 |
| 2019/0376728 | A1* | 12/2019 | Hayes | F25B 49/022 |

FOREIGN PATENT DOCUMENTS

| | | | | |
|---|---|---|---|---|
| CN | 101688697 A | | 3/2010 | |
| CN | 101809378 A | | 8/2010 | |
| CN | 103717981 A | | 4/2014 | |
| DE | 102006050232 B3 * | | 2/2008 | ............. F25B 9/008 |
| FR | 2992913 A1 | | 1/2014 | |
| WO | 2006/015629 A1 | | 2/2006 | |
| WO | WO-2006015741 A1 * | | 2/2006 | ............. F25B 1/005 |
| WO | WO-2008130357 A1 * | | 10/2008 | ............... F25B 1/10 |
| WO | WO 2008130359 A1 * | | 10/2008 | |
| WO | WO-2009039873 A1 * | | 4/2009 | ............... F25B 1/10 |
| WO | WO 2009041959 A1 * | | 4/2009 | |
| WO | WO-2009091397 A1 * | | 7/2009 | ........... F25B 49/005 |
| WO | WO-2009091398 A1 * | | 7/2009 | ............. F25B 41/04 |
| WO | WO-2009091400 A1 * | | 7/2009 | ............. F25B 9/008 |
| WO | WO-2010039682 A2 * | | 4/2010 | ............... F25B 1/10 |
| WO | WO-2011049767 A2 * | | 4/2011 | ........... B60H 1/3232 |
| WO | WO-2011049778 A1 * | | 4/2011 | ............... F25B 1/10 |
| WO | WO-2011112495 A2 * | | 9/2011 | ........... B60H 1/3228 |
| WO | 2012/076049 A1 | | 6/2012 | |
| WO | WO-2012109057 A2 * | | 8/2012 | ............... F25B 1/10 |
| WO | WO-2013016403 A1 * | | 1/2013 | ............... F25B 1/10 |
| WO | WO 2013016403 A1 * | | 1/2013 | |
| WO | 2013/169591 A1 | | 11/2013 | |
| WO | WO-2014031559 A1 * | | 2/2014 | ........... F25B 49/022 |

OTHER PUBLICATIONS

First Examination Report for Indian Serial No. 201717021000 dated Aug. 30, 2019.

\* cited by examiner

METHOD FOR OPERATING A VAPOUR COMPRESSION SYSTEM WITH A RECEIVER

CROSS-REFERENCE TO RELATED APPLICATIONS

This application is a National Stage application of International Patent Application No. PCT/EP2015/073155, filed on Oct. 7, 2015, which claims priority to European Patent Application No. 14193783.9, filed on Nov. 19, 2014, each of which is hereby incorporated by reference in its entirety.

TECHNICAL FIELD

The present invention relates a method for operating a vapour compression system in an energy efficient manner, within a wide range of ambient temperatures. The method of the invention is particularly suitable for vapour compression systems in which a transcritical refrigerant, such as $CO_2$, is applied.

BACKGROUND

In some refrigeration systems, a high pressure valve is arranged in a refrigerant path, at a position downstream relative to a heat rejecting heat exchanger. Thereby refrigerant leaving the heat rejecting heat exchanger passes through the high pressure valve, and the pressure of the refrigerant is thereby reduced. This is, e.g., relevant in vapour compression systems in which a transcritical refrigerant, such as $CO_2$, is applied, and where the pressure of refrigerant leaving the heat rejecting heat exchanger is expected to be relatively high.

In such vapour compression systems, a receiver is sometimes arranged between the high pressure valve and an expansion device arranged to supply refrigerant to an evaporator. In the receiver, liquid refrigerant is separated from gaseous refrigerant. The liquid refrigerant is supplied to the evaporator, via the expansion device, and the gaseous refrigerant may be supplied to a compressor. Thereby the gaseous part of the refrigerant is not subjected to the pressure drop introduced by the expansion device, and the work required in order to compress the refrigerant can therefore be reduced.

If the pressure inside the receiver is high, the work required by the compressors in order to compress the gaseous refrigerant received from the receiver is correspondingly low. On the other hand, a high pressure inside the receiver has an impact on the liquid/gas ratio of the refrigerant in the receiver to the effect that less gaseous and more liquid refrigerant is present, and a too high pressure inside the receiver is therefore not desirable, as it forces the pressure inside the heat rejecting heat exchanger to be even higher, thereby decreasing the efficiency of the vapour compression system. Furthermore, at low ambient temperatures, the efficiency of the vapour compression system is normally improved when the pressure inside the heat rejecting heat exchanger is relatively low.

Accordingly, a suitable pressure level inside the receiver must be defined, which balances the work required by the compressor and other system requirements, as described above. However, whether or not a given pressure level is suitable depends on the operating conditions, in particular on the ambient temperature. Therefore a pressure level is sometimes selected, which is suitable under the most common operating conditions, but may not be suitable under the operating conditions prevailing at a given, specific time. In this case the vapour compression system may be controlled in a relatively energy efficient manner some of the time.

WO 2012/076049 A1 discloses a refrigeration system configured for circulating a refrigerant and comprising in flow direction of the refrigerant: a heat rejecting heat exchanger, a receiver, an expansion device, an evaporator, a compressor, and a coldness storage device. The coldness storage device is configured to receive and store coldness during the operation of the refrigeration system, and to cool refrigerant stored within the receiver and/or to cool refrigerant leaving the heat rejecting heat exchanger before entering the receiver. The pressure inside the receiver can be decreased by cooling the refrigerant in the receiver by means of the coldness storage device.

WO 2013/169591 A1 discloses an integrated $CO_2$ refrigeration and air conditioning system including one or more $CO_2$ compressors configured to discharge refrigerant at a higher pressure, and a receiver configured to receive refrigerant at a lower pressure through a high pressure valve. An AC compressor is arranged in parallel with the one or more $CO_2$ compressors and is configured to receive $CO_2$ vapour from both an AC evaporator and the receiver.

SUMMARY

It is an object of embodiments of the invention to provide a method for controlling a vapour compression system in an energy efficient manner within a wide range of ambient temperatures.

The invention provides a method for controlling a vapour compression system, the vapour compression system comprising a compressor unit comprising one or more compressors, a heat rejecting heat exchanger, a high pressure valve, a receiver, an expansion device and an evaporator arranged in a refrigerant path, wherein at least one of the compressors of the compressor unit is connectable to a gaseous outlet of the receiver, and at least one of the compressors of the compressor unit is connectable to an outlet of the evaporator, the method comprising the steps of:

measuring a parameter of the vapour compression system, where an enthalpy of refrigerant leaving the heat rejecting heat exchanger can be derived from the measured parameter, calculating a setpoint value for a pressure inside the receiver, based on the measured parameter, and operating the compressor unit in accordance with the calculated setpoint value, and in order to obtain a pressure inside the receiver which is equal to the calculated setpoint value.

The invention relates to a method for controlling a vapour compression system. In the present context, the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor unit comprising one or more compressors, a heat rejecting heat exchanger, a high pressure valve, a receiver, an expansion device, e.g. in the form of an expansion valve, and an evaporator arranged in a refrigerant path. At least one of the compressors of the compressor unit is connectable to a gaseous outlet of the receiver, and at least one of the compressors of the compressor unit is connectable to an outlet of the evaporator. Accordingly, the compressor(s) of the compressor unit may receive refrigerant from the gaseous outlet of the receiver and/or from the outlet of the evaporator.

Refrigerant flowing in the refrigerant path is compressed by the compressor(s) of the compressor unit. The compressed refrigerant is supplied to the heat rejecting heat exchanger, where heat exchange takes place with the ambient in such a manner that heat is rejected from the refrigerant flowing through the heat rejecting heat exchanger. In the case that the heat rejecting heat exchanger is in the form of a condenser, the refrigerant is at least partly condensed when passing through the heat rejecting heat exchanger. In the case that the heat rejecting heat exchanger is in the form of a gas cooler, the refrigerant flowing through the heat rejecting heat exchanger is cooled, but it remains in a gaseous state.

From the heat rejecting heat exchanger, the refrigerant is supplied to the high pressure valve, where the pressure of the refrigerant is reduced, before the refrigerant is supplied to the receiver. In the receiver, the refrigerant is separated into a liquid part and a gaseous part. The liquid part of the refrigerant is supplied to the expansion device, where the pressure of the refrigerant is reduced before the refrigerant is supplied to the evaporator. The refrigerant being supplied to the evaporator is thereby in a mixed gaseous and liquid state. In the evaporator, the liquid part of the refrigerant is at least partly evaporated, while heat exchange takes place with the ambient in such a manner that heat is absorbed by the refrigerant flowing through the evaporator. Finally, the refrigerant is supplied to the compressor unit.

The gaseous part of the refrigerant in the receiver is supplied to the compressor unit. Thereby the gaseous refrigerant is not subjected to the pressure drop introduced by the expansion device, and energy is conserved, as described above.

Thus, at least part of the refrigerant flowing in the refrigerant path is alternatingly compressed by the compressors and expanded by the expansion device, while heat exchange takes place at the heat rejecting heat exchanger and at the evaporator. Thereby cooling or heating of a volume can be obtained.

According to the method of the invention, a parameter of the vapour compression system is initially measured. The measured parameter is of such a kind that an enthalpy of refrigerant leaving the heat rejecting heat exchanger can be derived from the measured parameter. Thus, the measured parameter provides information regarding the enthalpy of the refrigerant leaving the heat rejecting heat exchanger, and thereby information relating to internal energy and pressure of the refrigerant.

Then a setpoint value for a pressure inside the receiver is calculated, based on the measured parameter. As described above, whether or not a given pressure inside the receiver is considered 'optimal' depends on various operating conditions, such as the ambient temperature and/or the temperature of a fluid of a secondary fluid flow across the heat rejecting heat exchanger. When such operating conditions change, the enthalpy of the refrigerant leaving the evaporator will also change.

The measured parameter is of a kind which is related to the enthalpy of the refrigerant leaving the heat rejecting heat exchanger in such a manner that the enthalpy can be derived therefrom. This will be described in further detail below.

Accordingly, the setpoint value for the pressure inside the receiver is calculated, based on a parameter reflecting the enthalpy of the refrigerant leaving the heat rejecting heat exchanger. Thereby the setpoint value takes the prevailing operating conditions into account, and it can be ensured that the calculated setpoint value is in fact 'optimal' under the prevailing operating conditions.

Finally, the compressor unit is operated in accordance with the calculated setpoint value, and in order to obtain a pressure inside the receiver which is equal to the calculated setpoint value. Thus, the compressor unit is operated in order to obtain a pressure inside the receiver, which is 'optimal' under the prevailing operating conditions. Accordingly, the vapour compression system is operated in an energy efficient manner, regardless of the prevailing operating conditions, notably regardless of the prevailing ambient temperature. Thus, the vapour compression system can be operated in an energy efficient manner, within a wide range of ambient temperatures.

It should be noted that the temperature of the refrigerant inside the receiver is closely related to the pressure of the refrigerant inside the receiver. Therefore, instead of calculating a setpoint value for the pressure inside the receiver, and operating the compressor unit in order to obtain this pressure inside the receiver, a setpoint value for the temperature inside the receiver could be calculated, and the compressor unit could be operated in order to obtain a temperature of the refrigerant inside the receiver, which is equal to the calculated setpoint temperature value.

The step of measuring a parameter may comprise measuring an ambient temperature prevailing in a region of the heat rejecting heat exchanger. The ambient temperature could, e.g., be an outdoor temperature. Preferably, the ambient temperature is a temperature of a fluid which the heat rejecting heat exchanger is in contact with. The fluid may be an air stream or a liquid stream passed over the heat rejecting heat exchanger in order to absorb heat from the refrigerant flowing through the heat rejecting heat exchanger.

The temperature and the pressure of refrigerant leaving the heat rejecting heat exchanger are related to the ambient temperature. Accordingly, the enthalpy of refrigerant leaving the heat rejecting heat exchanger is also related to the ambient temperature. Accordingly, the enthalpy of the refrigerant leaving the heat rejecting heat exchanger can be derived from the ambient temperature, and therefore the ambient temperature prevailing in a region of the heat rejecting heat exchanger is a suitable parameter for use in calculating the setpoint value for the pressure inside the receiver. The ambient temperature may, e.g., be measured by means of a temperature sensor arranged in a fluid stream passing the heat rejecting heat exchanger. The ambient temperature is a particularly suitable parameter, since it is very easy to measure.

When the ambient temperature is high, the temperature as well as the pressure of the refrigerant leaving the heat rejecting heat exchanger will normally also be high. This may, e.g., be the case during a summer period. Accordingly, the enthalpy of the refrigerant leaving the heat rejecting heat exchanger is high in this case. Furthermore, under these circumstances, it is beneficial to have a high pressure in the receiver for the following reasons. A 'trade-off' is performed, identifying an "optimum", with respect to the pressure inside the receiver, balancing the work required by the compressor and other system requirements, as described above. When the pressure inside the receiver is increased, the work required by the "receiver compressor" in order to compress the refrigerant is reduced, thereby reducing the power consumption of the compressor. However, this also results in less vapour being produced by the expansion, with the result that a larger part of the refrigerant will have to pass through the "main compressor", thereby requiring additional energy consumption. Based on thermophysical properties, it can be shown that an optimum exists, and that the optimum changes depending on the conditions prevailing at the outlet of the heat rejecting heat exchanger. Therefore, under these circumstances a high setpoint value for the pressure inside the receiver is calculated. Thereby the work required by the compressor in order to compress the refrigerant is reduced, and energy is conserved, as described above.

On the other hand, when the ambient temperature is low, the temperature as well as the pressure of the refrigerant leaving the heat rejecting heat exchanger will normally also be low. This may, e.g., be the case during a winter period. Accordingly, the enthalpy of the refrigerant leaving the heat rejecting heat exchanger is low in this case. Under these circumstances it is not beneficial to have a high pressure in the receiver, applying arguments similar to the arguments presented above. Therefore, under these circumstances a low setpoint value for the pressure inside the receiver is calculated. Thereby a sufficient supply of refrigerant for the evaporator is ensured.

Alternatively or additionally, the step of measuring a parameter may comprise measuring a temperature of refrigerant leaving the heat rejecting heat exchanger. The pressure of the refrigerant leaving the heat rejecting heat exchanger is related to the temperature of the refrigerant leaving the heat rejecting heat exchanger. Accordingly, the enthalpy of the refrigerant leaving the heat rejecting heat exchanger is also related to the temperature of the refrigerant leaving the heat rejecting heat exchanger, and the enthalpy of refrigerant leaving the heat rejecting heat exchanger can therefore be derived from the temperature of the refrigerant leaving the heat rejecting heat exchanger. Therefore the temperature of refrigerant leaving the heat rejecting heat exchanger is a suitable parameter for use in calculating the setpoint value for the pressure inside the receiver.

The temperature of the refrigerant leaving the heat rejecting heat exchanger may, e.g., be measured by means of a temperature probe arranged in the refrigerant path downstream relative to the heat rejecting heat exchanger. Alternatively, the temperature may be measured by means of a temperature sensor arranged on an exterior surface of a pipe forming part of the refrigerant path downstream relative to the heat rejecting heat exchanger.

As described above, when the temperature of refrigerant leaving the heat rejecting heat exchanger is high, the enthalpy of the refrigerant leaving the heat rejecting heat exchanger is also high, and a high setpoint value for the pressure inside the receiver is therefore calculated under these circumstances.

Similarly, when the temperature of refrigerant leaving the heat rejecting heat exchanger is low, the enthalpy of the refrigerant leaving the heat rejecting heat exchanger is also low, and a low setpoint value for the pressure inside the receiver is therefore calculated under these circumstances.

Alternatively or additionally, the step of measuring a parameter may comprise measuring a pressure of refrigerant leaving the heat rejecting heat exchanger. Since the enthalpy of the refrigerant leaving the heat rejecting heat exchanger is related to the pressure of the refrigerant leaving the heat rejecting heat exchanger, the enthalpy of the refrigerant leaving the heat rejecting heat exchanger can be derived from the pressure of the refrigerant leaving the heat rejecting heat exchanger. Therefore the pressure of refrigerant leaving the heat rejecting heat exchanger is a suitable parameter for use in calculating the setpoint value for the pressure inside the receiver.

The pressure of the refrigerant leaving the heat rejecting heat exchanger may, e.g., be measured by means of a pressure sensor arranged in the refrigerant path, downstream relative to the heat rejecting heat exchanger.

As described above, when the pressure of the refrigerant leaving the heat rejecting heat exchanger is high, the enthalpy of the refrigerant leaving the heat rejecting heat exchanger is also high, and a high setpoint value for the pressure inside the receiver is therefore calculated under these circumstances.

Similarly, when the pressure of refrigerant leaving the heat rejecting heat exchanger is low, the enthalpy of the refrigerant leaving the heat rejecting heat exchanger is also low, and a low setpoint value for the pressure inside the receiver is therefore calculated under these circumstances.

The vapour compression system may be arranged to have a transcritical refrigerant, such as $CO_2$, flowing in the refrigerant path. In vapour compression systems of this kind, the pressure prevailing in the high pressure part of the system is normally relatively high. It is therefore very relevant to reduce the work required by the compressors in order to compress the refrigerant in vapour compression systems of this kind.

The heat rejecting heat exchanger may be a gas cooler. In this case the refrigerant flowing through the heat rejecting heat exchanger remains in a gaseous phase, and the gaseous refrigerant is merely cooled due to the heat exchange taking place in the heat rejecting heat exchanger. Gas coolers are typically applied when a transcritical refrigerant, such as $CO_2$, is used in the vapour compression system.

As an alternative, the heat rejecting heat exchanger may be a condenser. In this case the refrigerant passing through the heat rejecting heat exchanger is at least partly condensed, during the heat exchange taking place.

The vapour compression system may further comprise a bypass valve arranged in a refrigerant path interconnecting the receiver and the compressor unit, and the method may further comprise the step of opening the bypass valve in the case that the pressure inside the receiver decreases below a predefined threshold value. The bypass valve may further be opened in the case that the pressure inside the receiver becomes very high, indicating that the "receiver compressors" are not capable of compressing the amount of gaseous refrigerant being present in the receiver.

When the pressure inside the receiver decreases below the predefined threshold value, the amount of gaseous refrigerant being available in the receiver is so small that it is insufficient to properly operate a dedicated compressor. Therefore, in this case the bypass valve is opened, and the gaseous part of the refrigerant in the receiver is instead mixed with the refrigerant leaving the evaporator, before it reaches the compressor unit. Such a decrease in pressure may, e.g., be the result of a temperature of refrigerant leaving the heat rejecting heat exchanger decreasing below a certain value.

The step of calculating a setpoint may comprise solving the equation:

$$P_{setpoint} = a \cdot x + b,$$

wherein a and b are predefined constants depending on thermophysical properties of a refrigerant flowing in the refrigerant path, $P_{setpoint}$ is the setpoint value for the pressure inside the receiver, and x is the measured parameter.

The thermophysical properties may, e.g., be derived from a log P-H diagram of the refrigerant flowing in the refrigerant path. This may, e.g., include calculating a coefficient of performance (COP) for a number of different receiver pressure values from heat rejecting heat exchanger pressure to evaporator pressure, for a range of outlet conditions for the heat rejecting heat exchanger. Then a line of optimal points may be created, with a lower and an upper limit. The measured parameter may, e.g., be an ambient temperature, as described above.

The constants, a and b, depend on various properties of the vapour compression system, and for a given vapour compression system, a and b can be determined, based on the properties, and possibly expected operating conditions. The constants, a and b, may be determined in such a manner that the operation of the vapour compression system is optimised. Thus, for a given vapour compression system, a and b are determined, e.g. initially, and during operation, the equation above is simply solved, using the initially determined constants, a and b. As an alternative, the constants, a and b, may be auto-adjusted during operation, in such a manner that the constants, a and b, are optimal for the specific vapour compression system, based on actual measured performance of the vapour compression system.

According to this embodiment, the setpoint value for the pressure inside the receiver depends linearly on the measured parameter. The constants, a and b, will typically depend on the specific vapour compression system, and will therefore have to be determined specifically for each vapour compression system. However, once a and b have been determined, the setpoint value for the pressure inside the receiver can easily be calculated on the basis of the measured parameter (x), and using the equation above.

As an alternative, the step of calculating a setpoint may comprise solving other kinds of equations. For instance, the equation to determine the optimal setpoint for the receiver pressure under the current operating conditions could take be one of the equations outlined below:

$$P_{setpoint}=a \cdot x^2+b \cdot x+c, \text{ or higher order polynomials.}$$

$$P_{setpoint}=a \cdot \ln(x)+b, \text{ or other logarithmic functions.}$$

$$P_{setpoint}=a^x+b, \text{ or other exponential functions.}$$

The compressor unit may comprise one or more main compressors connected between an outlet of the evaporator and an inlet of the heat rejecting heat exchanger, and one or more receiver compressors connected between a gaseous outlet of the receiver and an inlet of the heat rejecting heat exchanger, and the step of operating the compressor unit in accordance with the calculated setpoint value may comprise operating the one or more receiver compressors.

According to this embodiment, some of the compressors of the compressor unit, i.e. the main compressors, are dedicated for compressing refrigerant received from the outlet of the evaporator, and some of the compressors of the compressor unit, i.e. the receiver compressors, are dedicated for compressing refrigerant received from the gaseous outlet of the receiver. In this case, the pressure inside the receiver can be adjusted by controlling the receiver compressors, notably by adjusting a compressor capacity of the receiver compressors.

For instance, in the case that the pressure inside the receiver must be decreased in order to reach the calculated setpoint value, then the compressor capacity of the receiver compressors is increased. Thereby more gaseous refrigerant is sucked from the receiver to the compressor unit, and the pressure inside the receiver therefore decreases.

Similarly, in the case that the pressure inside the receiver must be increased in order to reach the calculated setpoint value, then the compressor capacity of the receiver compressors is decreased. Thereby less gaseous refrigerant is sucked from the receiver to the compressor unit, and the pressure inside the receiver therefore increases.

The compressor capacity of the receiver compressors may, e.g., be adjusted by adjusting a speed of one or more of the receiver compressors, and/or by switching one or more receiver compressors on or off.

As an alternative, at least one of the compressors of the compressor unit may be selectively connectable to the gaseous outlet of the receiver or to the outlet of the evaporator, and the step of operating the compressor unit in accordance with the calculated setpoint value may comprise switching at least one compressor between being connected to the gaseous outlet of the receiver and being connected to the outlet of the evaporator.

According to this embodiment, at least some of the compressors of the compressor unit are not dedicated for compressing refrigerant received from either the outlet of the evaporator or the gaseous outlet of the receiver. Instead, at least some of the compressors of the compressor units may be switched between a state in which they compress refrigerant received from the outlet of the evaporator, and a state in which they compress refrigerant received from the gaseous outlet of the receiver. Thus, these compressors may selectively operate as a 'main compressor' or as a 'receiver compressor', depending on what is currently required. Accordingly, the available compressor capacity provided by these compressors can be distributed in a suitable manner between 'main compressor capacity' and 'receiver compressor capacity'.

The switchable compressors may, e.g., each be provided with a valve, such as a three way valve, in which case a state of the valve determines whether the compressor receives refrigerant from the outlet of the evaporator or from the gaseous outlet of the receiver.

According to this embodiment, the pressure inside the receiver can be adjusted by adjusting the amount of compressor capacity being assigned to compressing refrigerant received from the gaseous outlet of the receiver, e.g. by adjusting the number of compressors being in a state where they receive refrigerant from the gaseous outlet of the receiver.

For instance, in the case that the pressure inside the receiver must be decreased in order to reach the calculated setpoint value, then one or more of the compressors, which are currently connected to the outlet of the evaporator is/are switched to a state where it/they is/are connected to the gaseous outlet of the receiver. Thereby the compressor capacity assigned to compressing refrigerant received from the gaseous outlet of the receiver is increased, more gaseous refrigerant is sucked from the receiver to the compressor unit, and the pressure inside the receiver therefore decreases.

Similarly, in the case that the pressure inside the receiver must be increased in order to reach the calculated setpoint value, then one or more of the compressors, which are currently connected to the gaseous outlet of the receiver is/are switched to a state where it/they is/are connected to the outlet of the evaporator. Thereby the compressor capacity assigned to compressing refrigerant received form the gaseous outlet of the receiver is decreased, less gaseous refrigerant is sucked from the receiver to the compressor unit, and the pressure inside the receiver therefore increases.

The vapour compression system may further comprise a heat exchanger arranged in a refrigerant path interconnecting the gaseous outlet of the receiver and the compressor unit. According to this embodiment, the refrigerant flowing from the gaseous outlet of the receiver towards the compressor unit can be heated by means of the heat exchanger. Vapour supplied by the receiver is, by definition, saturated vapour, just at the edge of condensing. By heating the refrigerant a superheat of the refrigerant is generated, which may be required by some compressors.

BRIEF DESCRIPTION OF THE DRAWINGS

The invention will now be described in further detail with reference to the accompanying drawings in which.

DETAILED DESCRIPTION

Figure 1:
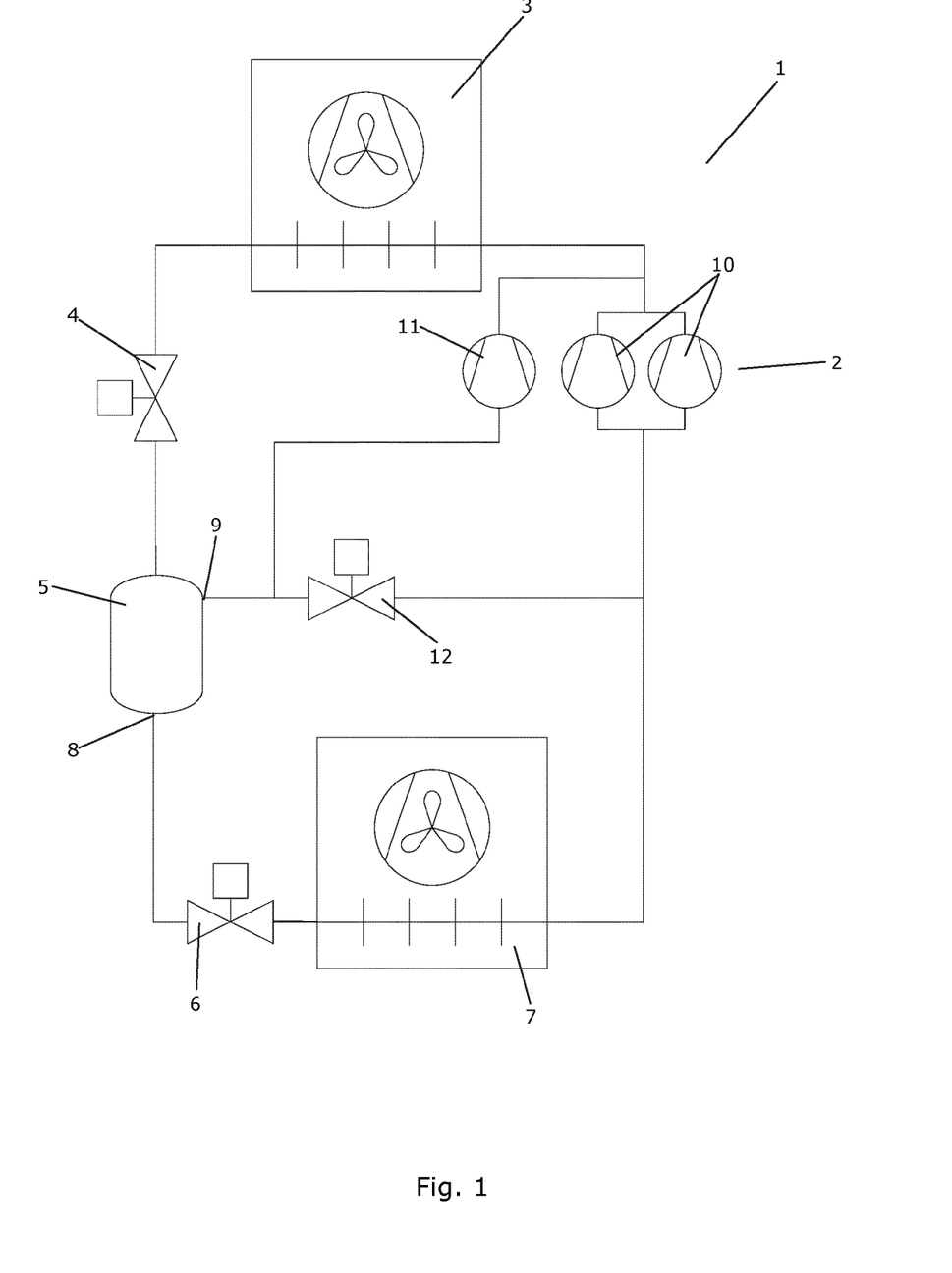
FIG. 1 is a diagrammatic view of a vapour compression system being controlled using a method according to a first embodiment of the invention.

FIG. 1 is a diagrammatic view of a vapour compression system 1 being controlled using a method according to a first embodiment of the invention. The vapour compression system 1 comprises a compressor unit 2, a heat rejecting heat exchanger 3, a high pressure valve 4, a receiver 5, an expansion device 6, in the form of an expansion valve, and an evaporator 7 arranged in a refrigerant path. The receiver 5 comprises a liquid outlet 8 and a gaseous outlet 9. The liquid outlet 8 is connected to the expansion device 6, i.e. the liquid part of the refrigerant in the receiver 5 is supplied to the evaporator 7, via the expansion device 6.

The compressor unit 2 comprises two main compressors 10 and a receiver compressor 11. The inlets of the main compressors 10 are connected to an outlet of the evaporator 7. Thus, the main compressors 10 are dedicated for compressing refrigerant received from the outlet of the evaporator 7.

The inlet of the receiver compressor 11 is connected to the gaseous outlet 9 of the receiver 5. Thus, the receiver compressor 11 is dedicated for compressing refrigerant received from the gaseous outlet 9 of the receiver 5.

The vapour compression system 1 further comprises a bypass valve 12 arranged in a refrigerant path interconnecting the gaseous outlet 9 of the receiver 5 and the inlets of the main compressors 10. Thus, when the bypass valve 12 is open, gaseous refrigerant from the receiver 5 is supplied to the main compressors 10.

The vapour compression system 1 of FIG. 1 may be operated in the following manner. Refrigerant is compressed by the compressors 10, 11 of the compressor unit 2 before being supplied to the heat rejecting heat exchanger 3. In the heat rejecting heat exchanger 3 heat exchange takes place between the refrigerant and the ambient, in such a manner that heat is rejected from the refrigerant flowing through the heat rejecting heat exchanger 3.

The refrigerant leaving the heat rejecting heat exchanger 3 is supplied to the high pressure valve 4, where the refrigerant undergoes expansion before being supplied to the receiver 5.

In the receiver 5 the refrigerant is separated into a liquid part and a gaseous part. The liquid part of the refrigerant is supplied to the expansion device 6, via the liquid outlet 8. The expansion device 6 expands the refrigerant before it is supplied to the evaporator 7. The refrigerant being supplied to the evaporator 7 is in a mixed liquid and gaseous state.

In the evaporator 7 the liquid part of the refrigerant is at least partly evaporated, while heat exchange takes place between the refrigerant and the ambient in such a manner that heat is absorbed by the refrigerant flowing through the evaporator 7. The refrigerant leaving the evaporator 7 is supplied to the main compressors 10.

The gaseous part of the refrigerant in the receiver 5 is supplied directly to the receiver compressor 11. Thereby the gaseous part of the refrigerant does not undergo the expansion introduced by the expansion device 6, and the work required by the receiver compressor 11 in order to compress the refrigerant is thereby reduced.

The higher the pressure inside the receiver 5, the more the work required by the receiver compressor 11 can be reduced. Therefore it is desirable to maintain a pressure inside the receiver 5 which is as high as possible, while taking the current operating conditions, including the ambient temperature, into account.

To this end a parameter of the vapour compression system is measured. The parameter is of a kind which is related to the enthalpy of the refrigerant leaving the heat rejecting heat exchanger 3 in such a manner that the enthalpy of the refrigerant leaving the heat rejecting heat exchanger 3 can be derived from the measured parameter. The measured parameter could, e.g., be an ambient temperature prevailing in a region of the heat rejecting heat exchanger 3, a temperature of refrigerant leaving the heat rejecting heat exchanger 3, and/or a pressure of refrigerant leaving the heat rejecting heat exchanger 3. In any event, the measured parameter reflects the enthalpy of the refrigerant leaving the heat rejecting heat exchanger 3.

Based on the measured parameter, a setpoint value for the pressure inside the receiver 5 is calculated. Since the measured parameter reflects the enthalpy of the refrigerant leaving the heat rejecting heat exchanger 3, the setpoint value for the pressure inside the receiver 5 is thereby calculated while taking the enthalpy of the refrigerant leaving the heat rejecting heat exchanger 3 into account. Accordingly, the setpoint value for the pressure inside the receiver 5 is calculated with due consideration to the prevailing operating conditions, including the ambient temperature. The calculated setpoint value must thereby be expected to represent an 'optimal' pressure level, under the given circumstances.

Finally, the receiver compressor 11 is operated in accordance with the calculated setpoint value, and in order to obtain a pressure inside the receiver 5 which is equal to the calculated setpoint value. This may include adjusting a compressor speed of the receiver compressor 11. For instance, when the pressure inside the receiver 5 is higher than the setpoint value, the compressor speed of the receiver compressor 11 is increased, and when the pressure inside the receiver 5 is lower than the setpoint value, the compressor speed of the receiver compressor 11 is decreased.

Thus, according to the method described above, a pressure inside the receiver 5 is obtained, which is optimal under the given operating conditions.

In the case that the pressure inside the receiver 5 decreases below a predefined threshold value, the amount of gaseous refrigerant in the receiver 5 is no longer sufficient to allow the receiver compressor 11 to operate properly. Therefore, in this case the receiver compressor 11 is stopped and the bypass valve 12 is opened. Thereby the gaseous refrigerant from the receiver 5 is supplied to the refrigerant path interconnecting the outlet of the evaporator 7 and the inlet of the main compressors 10. Thus, the gaseous refrigerant from the receiver 5 is mixed with the refrigerant leaving the evaporator 7, and the mixed refrigerant flow is supplied to the main compressors 10 and compressed by means of the main compressors 10 before being supplied to the heat rejecting heat exchanger 3.

Figure 2:
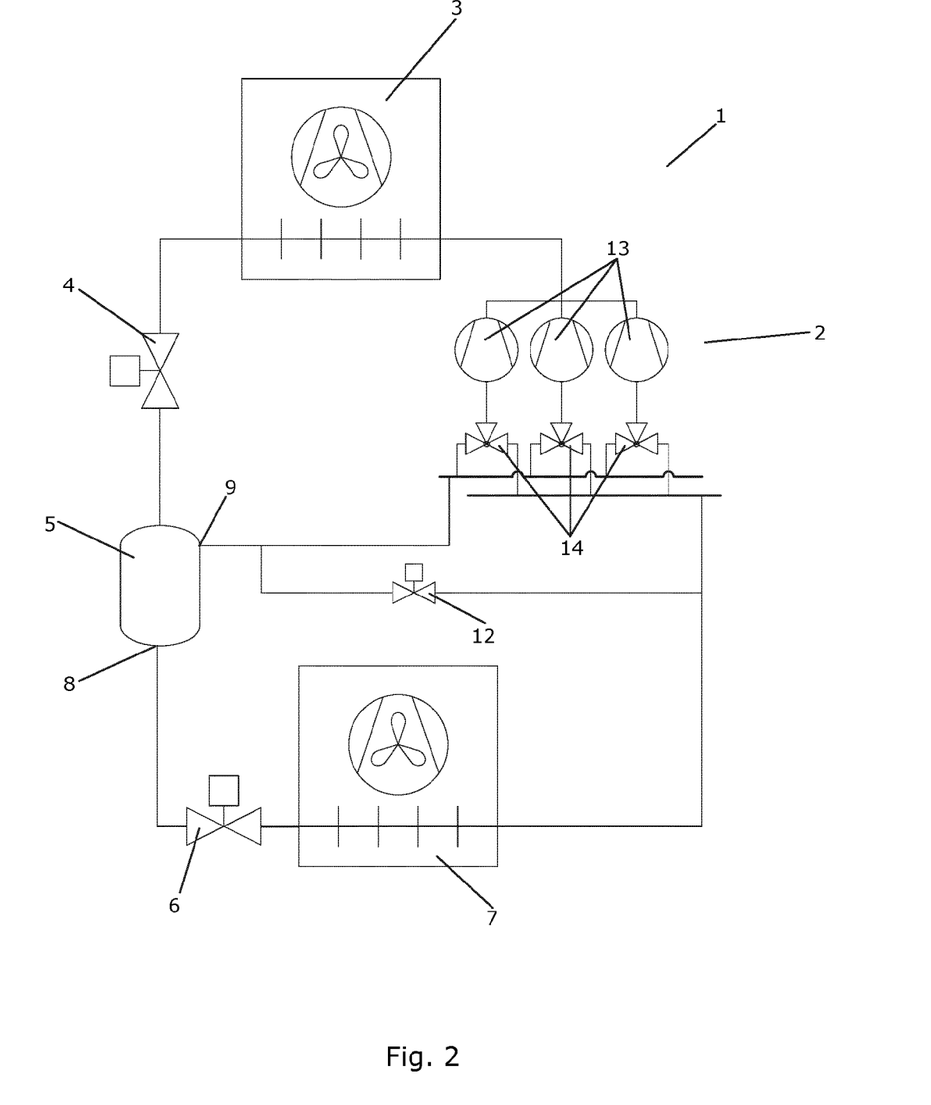
FIG. 2 is a diagrammatic view of a vapour compression system being controlled using a method according to a second embodiment of the invention.

FIG. 2 is a diagrammatic view of a vapour compression system 1 being controlled using a method according to a second embodiment of the invention. The vapour compression system 1 of FIG. 2 is very similar to the vapour compression system 1 of FIG. 1, and it will therefore not be described in detail here.

In the vapour compression system 1 of FIG. 2, the compressor unit 2 comprises three compressors 13. Each of the compressors 13 is provided with a three way valve 14 which is switchable between a position where refrigerant is supplied from the outlet of the evaporator 7 to the compressor 13, and a position where refrigerant is supplied from the gaseous outlet 9 of the receiver 5 to the compressor 13. Accordingly, each of the compressors 13 may selectively operate as a 'main compressor' or as a 'receiver compressor', and the total available compressor capacity of the compressor unit 2 can be distributed between 'main compressor capacity' and 'receiver compressor capacity', simply by setting the three way valves 14 in an appropriate manner.

The vapour compression system 1 of FIG. 2 is operated essentially as described above with reference to FIG. 1. However, in the vapour compression system 1 of FIG. 2 the pressure inside the receiver 5 is adjusted by switching one or more of the three way valves 14 between the two states described above.

For instance, when the pressure inside the receiver 5 is higher than the setpoint value, one or more of the three way valves 14 which are in the position where the outlet of the evaporator 7 is connected to the compressor 13, is/are switched to the position where the gaseous outlet 9 of the receiver 5 is connected to the compressor 13. Thereby the portion of the available compressor capacity which operates as 'receiver compressor' is increased, and the amount of gaseous refrigerant being sucked from the receiver 5 by the compressors 13 is increased. Accordingly, the pressure inside the receiver 5 is decreased towards the setpoint value.

Similarly, when the pressure inside the receiver 5 is lower than the setpoint value, one or more of the three way valves 14 which are in the position where the gaseous outlet 9 of the receiver 5 is connected to the compressor 13, is/are switched to the position where the outlet of the evaporator 7 is connected to the compressor 13. Thereby the portion of the available compressor capacity which operates as 'receiver compressor' is decreased, and the amount of gaseous refrigerant being sucked from the receiver 5 by the compressors 13 is decreased. Accordingly, the pressure inside the receiver 5 is increased towards the setpoint value.

In the case that the pressure inside the receiver 5 decreases below a predefined threshold value, the amount of gaseous refrigerant in the receiver 5 is no longer sufficient to allow one of the compressors 13 of the compressor unit 2 to operate properly, when the corresponding three way valve 14 is in the position where the gaseous outlet 9 of the receiver 5 is connected to the compressor 13. Therefore, in this case all of the three way valves 14 are switched to the position where the outlet of the evaporator 7 is connected to the compressor 13, and the bypass valve 12 is opened. Thereby the gaseous refrigerant from the receiver 5 is supplied to the refrigerant path interconnecting the outlet of the evaporator 7 and the compressors 13. Thus, the gaseous refrigerant from the receiver 5 is mixed with the refrigerant leaving the evaporator 7, and the mixed refrigerant flow is supplied to the compressors 13 where it is compressed before being supplied to the heat rejecting heat exchanger 3.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising:
   a compressor unit comprising one or more main compressors and one or more receiver compressors;
   a heat rejecting heat exchanger;
   a high pressure valve;
   a receiver;
   an expansion device;
   an evaporator arranged in a refrigerant path; and
   a bypass valve arranged in a refrigerant path interconnecting the receiver and the compressor unit;
   wherein at least one of the main compressors of the compressor unit is connectable to a gaseous outlet of the receiver, and at least one of the main compressors of the compressor unit is connectable to an outlet of the evaporator; and
   wherein at least one receiver compressor of the one or more receiver compressors is connected through a connecting line to the refrigerant path interconnecting the receiver and the compressor unit at a point between the receiver and the bypass valve;
   the method comprising the steps of:
      measuring a parameter of the vapour compression system, where an enthalpy of refrigerant leaving the heat rejecting heat exchanger can be derived from the measured parameter;
      deriving the enthalpy of refrigerant leaving the heat rejecting heat exchanger from the measured parameter;
      calculating a setpoint value for a pressure inside the receiver, based on the derived enthalpy; and
      operating the compressor unit in accordance with the calculated setpoint value, and in order to obtain a pressure inside the receiver which is equal to the calculated setpoint value.

2. The method according to claim 1, wherein the step of measuring a parameter comprises measuring an ambient temperature prevailing in a region of the heat rejecting heat exchanger.

3. The method according to claim 1, wherein the step of measuring a parameter comprises measuring a temperature of refrigerant leaving the heat rejecting heat exchanger.

4. The method according to claim 1, wherein the step of measuring a parameter comprises measuring a pressure of refrigerant leaving the heat rejecting heat exchanger.

5. The method according to claim 1, wherein the vapour compression system is arranged to have a transcritical refrigerant flowing in the refrigerant path.

6. The method according to claim 1, wherein the heat rejecting heat exchanger is a gas cooler.

7. The method according to claim 1, wherein the method further comprises the step of opening the bypass valve in the case that the pressure inside the receiver decreases below a predefined threshold value.

8. The method according to claim 1, wherein the step of calculating a setpoint comprises solving the equation:

$$P_{setpoint} = a \cdot x + b,$$

wherein a and b are predefined constants depending on thermophysical properties of a refrigerant flowing in the refrigerant path, $P_{setpoint}$ is the setpoint value for the pressure inside the receiver, and x is the measured parameter.

9. The method according to claim 1, wherein at least one main compressor of the one or more main compressors is connected between an outlet of the evaporator and an inlet of the heat rejecting heat exchanger, and at least one receiver compressor of the one or more receiver compressors is connected between a gaseous outlet of the receiver and an inlet of the heat rejecting heat exchanger, and wherein the step of operating the compressor unit in accordance with the calculated setpoint value comprises operating the one or more receiver compressors.

10. The method according to claim 1, wherein at least one of the main compressors of the compressor unit is selectively connectable to the gaseous outlet of the receiver or to the outlet of the evaporator, and wherein the step of operating the compressor unit in accordance with the calculated setpoint value comprises switching at least one main compressor between being connected to the gaseous outlet of the receiver and being connected to the outlet of the evaporator.

11. The method according to claim 1, wherein the vapour compression system further comprises a heat exchanger arranged in a refrigerant path interconnecting the gaseous outlet of the receiver and the compressor unit.

12. The method according to claim 2, wherein the step of measuring a parameter comprises measuring a temperature of refrigerant leaving the heat rejecting heat exchanger.

13. The method according to claim 2, wherein the step of measuring a parameter comprises measuring a pressure of refrigerant leaving the heat rejecting heat exchanger.

14. The method according to claim 3, wherein the step of measuring a parameter comprises measuring a pressure of refrigerant leaving the heat rejecting heat exchanger.

15. The method according to claim 2, wherein the vapour compression system is arranged to have a transcritical refrigerant flowing in the refrigerant path.

16. The method according to claim 3, wherein the vapour compression system is arranged to have a transcritical refrigerant flowing in the refrigerant path.

17. The method according to claim 4, wherein the vapour compression system is arranged to have a transcritical refrigerant flowing in the refrigerant path.

18. The method according to claim 2, wherein the heat rejecting heat exchanger is a gas cooler.

19. The method according to claim 3, wherein the heat rejecting heat exchanger is a gas cooler.

20. The method according to claim 4, wherein the heat rejecting heat exchanger is a gas cooler.

21. A method for controlling a vapour compression system, the vapour compression system comprising:
a compressor unit comprising one or more compressors;
a heat rejecting heat exchanger;
a high pressure valve;
a receiver;
an expansion device; and
an evaporator arranged in a refrigerant path;
wherein at least one of the compressors of the compressor unit is connectable to a gaseous outlet of the receiver;
wherein at least one of the compressors of the compressor unit is connectable to an outlet of the evaporator; and
wherein at least one compressor of the one or more compressors is provided with a compressor valve switchable between a first position where the at least one compressor is configured to receive refrigerant supplied from the outlet of the evaporator, and a second position where the at least one compressor is configured to receive refrigerant supplied from the gaseous outlet of the receiver;
the method comprising the steps of:
measuring a parameter of the vapour compression system, where an enthalpy of refrigerant leaving the heat rejecting heat exchanger can be derived from the measured parameter,
deriving the enthalpy of refrigerant leaving the heat rejecting heat exchanger from the measured parameter;
calculating a setpoint value for a pressure inside the receiver, based on the derived enthalpy, and
operating the compressor unit in accordance with the calculated setpoint value, and in order to obtain a pressure inside the receiver which is equal to the calculated setpoint value.

22. The method according to claim 21, wherein the vapour compression system further comprises a bypass valve arranged in a refrigerant path interconnecting the receiver and the compressor unit, and wherein at least one compressor of the one or more compressors is connected through a connecting line to the refrigerant path interconnecting the receiver and the compressor unit at a point between the receiver and the bypass valve.

23. The method according to claim 1, wherein the step of operating the compressor unit in accordance with the calculated setpoint value comprises increasing or decreasing a speed of the one or more receiver compressors or switching the one or more receiver compressors on or off.

24. The method according to claim 21, wherein the step of operating the compressor unit in accordance with the calculated setpoint value comprises increasing or decreasing a speed of the one or more compressors or switching the one or more compressors on or off.

25. The method according to claim 21, wherein the at least one compressor is configured to receive refrigerant supplied from the outlet of the evaporator through the compressor valve when the compressor valve is in the first position.

* * * * *